United States Patent
Ward (10) Patent No.: US 9,665,585 B2
(45) Date of Patent: May 30, 2017

(54) PRESERVING HIGH VALUE ENTRIES IN AN EVENT LOG

(71) Applicant: International Business Machines Corporation, Armonk, NY (US)

(72) Inventor: Calvin D. Ward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 14/603,509

(22) Filed: Jan. 23, 2015

(65) Prior Publication Data

US 2016/0217162 A1 Jul. 28, 2016

(51) Int. Cl.
*G06F 17/30* (2006.01)

(52) U.S. Cl.
CPC .. *G06F 17/30117* (2013.01); *G06F 17/30303* (2013.01); *G06F 17/30353* (2013.01)

(58) Field of Classification Search
None
See application file for complete search history.

(56) References Cited

U.S. PATENT DOCUMENTS

| | | | | |
|---|---|---|---|---|
| 6,732,124 B1* | 5/2004 | Koseki | ........... | G06F 11/1435 |
| 6,751,573 B1* | 6/2004 | Burch | ........... | G06F 11/0709 |
| | | | | 370/473 |
| 6,996,580 B2 | 2/2006 | Bae et al. | | |
| 7,143,317 B2 | 11/2006 | Lyle et al. | | |
| 7,870,355 B2* | 1/2011 | Erofeev | ........... | G06F 11/1456 |
| | | | | 711/100 |
| 7,904,929 B1* | 3/2011 | Jaunin | ........... | G06Q 30/0256 |
| | | | | 705/14.54 |
| 8,706,698 B2 | 4/2014 | Bachar et al. | | |
| 2002/0165902 A1* | 11/2002 | Robb | ........... | G06F 17/30368 |
| | | | | 709/202 |
| 2003/0185365 A1* | 10/2003 | Mansfield | ........... | H04M 1/56 |
| | | | | 379/142.01 |
| 2006/0036601 A1* | 2/2006 | Dudley | ........... | G06F 11/3476 |
| 2006/0095091 A1 | 5/2006 | Drew | | |
| 2011/0202999 A1 | 8/2011 | Logan et al. | | |
| 2014/0059013 A1* | 2/2014 | Chao | ........... | G06F 21/552 |
| | | | | 707/690 |

(Continued)

OTHER PUBLICATIONS

"Accelerated Examination Support Document", International Business Machines Corporation, dated Jul. 12, 2016, 21 pages.

(Continued)

*Primary Examiner* — Hung Le
(74) *Attorney, Agent, or Firm* — Scott S. Dobson (57) ABSTRACT

A first entry is received at an event log interface. The event log interface is configured to store received entries in an event log. It is determined that there is not enough storage space to store the first entry in the event log. A second entry is identified. The second entry is the oldest entry in the event log based on when the second entry was written to the event log. It is determined that the second entry contains an indicator to preserve. A copy of the second entry is sent to the event log interface to be written to the event log. One or more entries are deleted from the event log. The one or more entries includes the second entry. The first entry is written to the event log. The copy of the second entry is written to the event log.

20 Claims, 5 Drawing Sheets

(56) References Cited

U.S. PATENT DOCUMENTS

| | | | |
|---|---|---|---|
| 2014/0279907 A1* | 9/2014 | Koza | G06F 17/30575 |
| | | | 707/639 |
| 2015/0080674 A1 | 3/2015 | Drew et al. | |
| 2016/0086260 A1* | 3/2016 | Vermeulen | G06Q 40/00 |
| | | | 705/35 |

OTHER PUBLICATIONS

Ward, C., "Preserving High Value Entries in an Event Log", U.S. Appl. No. 15/209,867, filed Jul. 14, 2016.
List of IBM Patents or Patent Applications Treated as Related, dated Jul. 13, 2016, pp. 1-2.
Android Developers, "Reading and Writing Logs," http://developer.android.com/tools/debugging/debugging-log.html (last accessed Sep. 11, 2014 8:19 AM).
Django, "Django 1.6 documentation," http://django-chinese-docs-16.readthedocs.org/en/latest/topics/logging.html (last accessed Sep. 11, 2014 8:20 AM).
Hucaby, D., "Cisco ASA and PIX Firewall Logging," http://www.ciscopress.com/articles/asp?p=424447&seqNum=2, Nov. 4, 2005, © 2015 Pearson Education (last accessed Jan. 22, 2015 3:38 PM).
Microsoft, "5—As Easy as Falling Off a Log: Using the Logging Application Block," http://msdn.microsoft.com/en-us/library/dn440732 (v=pandp.60).aspx (last accessed Sep. 11, 2014 8:21 AM).

\* cited by examiner

PRESERVING HIGH VALUE ENTRIES IN AN EVENT LOG

BACKGROUND

The present disclosure relates to computing event logs, and more specifically, to preserving high value events in an event log.

A common design point for event logs is to wrap out the oldest entries when space is exhausted so that new entries can be added. In this context the "oldest entries" refers to the order in which they were entered into the event log and not the time stamp of the entry. Managing the log space with this "First In, First Out" design point is relatively easy. Entries are removed starting from the point in the storage area where the oldest entry is until there is enough space available for a new entry to be inserted. The specific implementation can vary. This design point is focused on making enough contiguous space by deleting entries from the oldest towards the more recent entries until enough space is available for a new entry to be inserted next to the most recent entry.

SUMMARY

According to embodiments of the present disclosure, a method for managing an event log is described. A first entry is received at an event log interface. The event log interface is configured to store received entries in an event log. It is determined that there is not enough storage space to store the first entry in the event log. A second entry is identified. The second entry is the oldest entry in the event log based on when the second entry was written to the event log. It is determined that the second entry contains an indicator to preserve. A copy of the second entry is sent to the event log interface to be written to the event log. One or more entries are deleted from the event log. The one or more entries includes the second entry. The first entry is written to the event log. The copy of the second entry is written to the event log.

Further described herein are embodiments of a computer program product for managing an event log. The computer program product includes a computer readable storage medium having program instructions embodied therewith, wherein the computer readable storage medium is not a transitory signal per se. The program instructions are executable by a computer to cause the computer to perform a method. As part of the method, a first entry is received at an event log interface. The event log interface is configured to store received entries in an event log. It is determined that there is not enough storage space to store the first entry in the event log. A second entry is identified. The second entry is the oldest entry in the event log based on when the second entry was written to the event log. It is determined that the second entry contains an indicator to preserve. A copy of the second entry is sent to the event log interface to be written to the event log. One or more entries are deleted from the event log. The one or more entries includes the second entry. The first entry is written to the event log. The copy of the second entry is written to the event log.

Further described herein are embodiments of a system for managing an event log. The system includes one or more processors, one or more computer-readable memories, one or more computer-readable tangible storage devices, and program instructions stored on at least one of the one or more storage devices for execution by at least one of the one or more processors via at least one of the one or more memories. The program instructions are configured to cause the system to perform a method. As part of the method, a first entry is received at an event log interface. The event log interface is configured to store received entries in an event log. It is determined that there is not enough storage space to store the first entry in the event log. A second entry is identified. The second entry is the oldest entry in the event log based on when the second entry was written to the event log. It is determined that the second entry contains an indicator to preserve. A copy of the second entry is sent to the event log interface to be written to the event log. One or more entries are deleted from the event log. The one or more entries includes the second entry. The first entry is written to the event log. The copy of the second entry is written to the event log.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to retaining high value event entries in an event log, and more particular aspects relate to copying high value event entries to reenter into an event log before deleting the high value entries using a First In, First Out method. While the present disclosure is not necessarily limited to such applications, various aspects of the disclosure may be appreciated through a discussion of various examples using this context.

It is not uncommon for event logs to get so much activity that they wrap out entries more quickly than desired. Some of those entries are of higher value or higher importance for addressing problems. It may be beneficial to retain certain entries for a longer period of time. For example, it may be important to retain entries relating to failures of a system, such as a failure to access a database, until the failure is fixed. These "high value" entries may be deleted before the issue can be fixed in a typical First In, First Out event log.

Embodiments of the present invention may provide for retaining high value entries in an event log using a modified First In, First Out method. An event log interface may handle incoming entries to be added to the event log. New event log entries may be processed to add information to the entries such as a timestamp, ID, or sequence value. The entries may also be checked to determine if they are high value entries. There may be a list of specific events or event types which is used to determine whether an entry is a high value entry. For example, an entry associated with an event on the list, such as a failure to access a database, may be a high value entry. An indicator to preserve the entry may be added to high value entries. The indicator to preserve may be any indicator, such as a specific string of one or more characters added to the entry.

When the event log is full and an entry is to be added to the event log, the First In, First Out method may be used to identify one or more entries to be deleted. If the entry to be deleted contains an indicator to preserve, a copy of the entry may be made and sent to the event log interface to be entered in to the event log again before deleting the original entry from the event log.

The event log interface may check incoming entries to determine if the entry is a new entry or a copy of a previous entry. This may be done, for example, by identifying an indicator to preserve in the received entry. New entries may be treated differently than copies of previous entries. For example, information may be added to new entries such as a timestamp, identification value, or sequence number and copies of previous entries may be written to the event log "as-is" because the copies already contain this information. Particularly, the previous timestamp may be retained such that the timestamp represents when the event occurred that is associated with the entry.

User interfaces or functions which provide a chronological view or list of events may sort events by timestamp rather than using the order that the entry was entered into the event log as the order that the entries as they were written into the event log may not represent the actual order of the events when some entries are copies of previous entries.

In some embodiments, identifying an entry to copy and send to the event log interface may involve more than just identifying an indicator to preserve. For example, in some embodiments, a copy may not be made unless entries with an indicator to preserve account for less than a specified amount of the storage space for the event log (e.g. less than 50%). Further, in some embodiments, a copy may not be made unless the event occurred within a specified period of time. For example, the copy may be made if the entry has a timestamp indicating it is not more than 2 years old. These extra requirements for copying an entry may help to prevent the event log from becoming stuck trying to add new entries when the event log is full of entries with an indicator to preserve.

In some embodiments, entries which are modified will be checked again to determine if they meet the criteria to preserve after the modification. An indicator to preserve the entry may be added to the entry or removed from the modified entry if the entry's status changes with regard to the criteria to preserve. For example, an entry may be associated with an error which occurred and the entry may contain an indicator to preserve. The entry may also contain an indicator that the issue has not been resolved. Once the issue is resolved, the entry may be modified to remove the indicator that the issue has not been resolved. When the entry is checked again after being modified, the entry may no longer meet the criteria to preserve. If the criteria to preserve an entry are no longer met, the indicator to preserve the entry may be removed.

Figure 1:
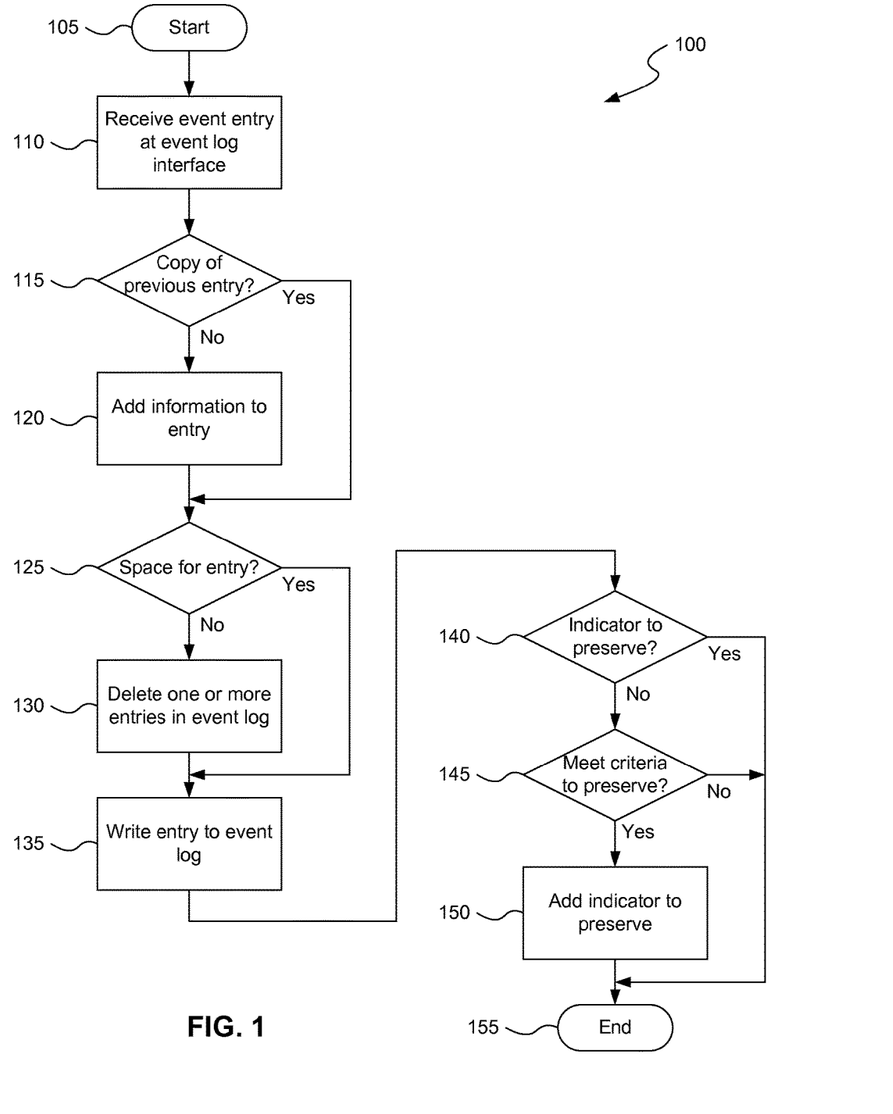
FIG. 1 depicts a flow diagram of an example method for handling a received entry at an event log interface.

Referring to FIG. 1, a flow diagram of an example method 100 for handling a received entry at an event log interface is depicted. Method 100 starts at block 105. At block 110, an event entry is received at the event log interface. The entry may be a new entry received from a client or a copy of a previous entry from the event log. At block 115, it is determined whether the entry is a copy of a previous entry. In some embodiments, this may include determining whether the entry contains an indicator to preserve the entry as previous entries which are received by the event log interface may contain an indicator to preserve.

If the entry is not a copy of a previous entry, method 100 proceeds to block 120 and adds information to the entry. The information may include a timestamp, identification value, a sequence number, or any other information which may be added to the entry to be written in the event log. If the entry is a copy of a previous entry, method 100 skips block 120 and proceeds to block 125. This allows the copy of the previous entry to retain the information added when the original entry was received at the event log interface. For example, the copy of the entry may retain the timestamp of the original entry.

At block 125, it is determined whether there is enough space for the entry in the event log. If there is not enough room in the event log, method 100 proceeds to block 130 and deletes one or more entries in the event log to make room. An example method for deleting the entries is described herein in reference to FIG. 2. If there is enough room in the event log, method 100 skips block 130 and proceeds to block 135. At block 135, the entry is written to the event log.

At block 140, it is determined whether the entry contains an indicator to preserve. An entry may contain an indicator to preserve if it is a copy of a previous entry. If the entry contains an indicator to preserve, method 100 proceeds to block 155 and ends. If the entry does not contain an indicator to preserve, method 100 proceeds to block 145. At block 145, it is determined whether the entry meets criteria to preserve. Determining whether the entry meets the criteria to preserve may include determining whether the event associated with the entry is included in a list of events to preserve. If the entry does not meet the criteria to preserve, method 100 proceeds to block 155 and ends. If the entry meets the criteria to preserve, method 100 proceeds to block 150 and adds an indicator to preserve to the entry.

Figure 2:
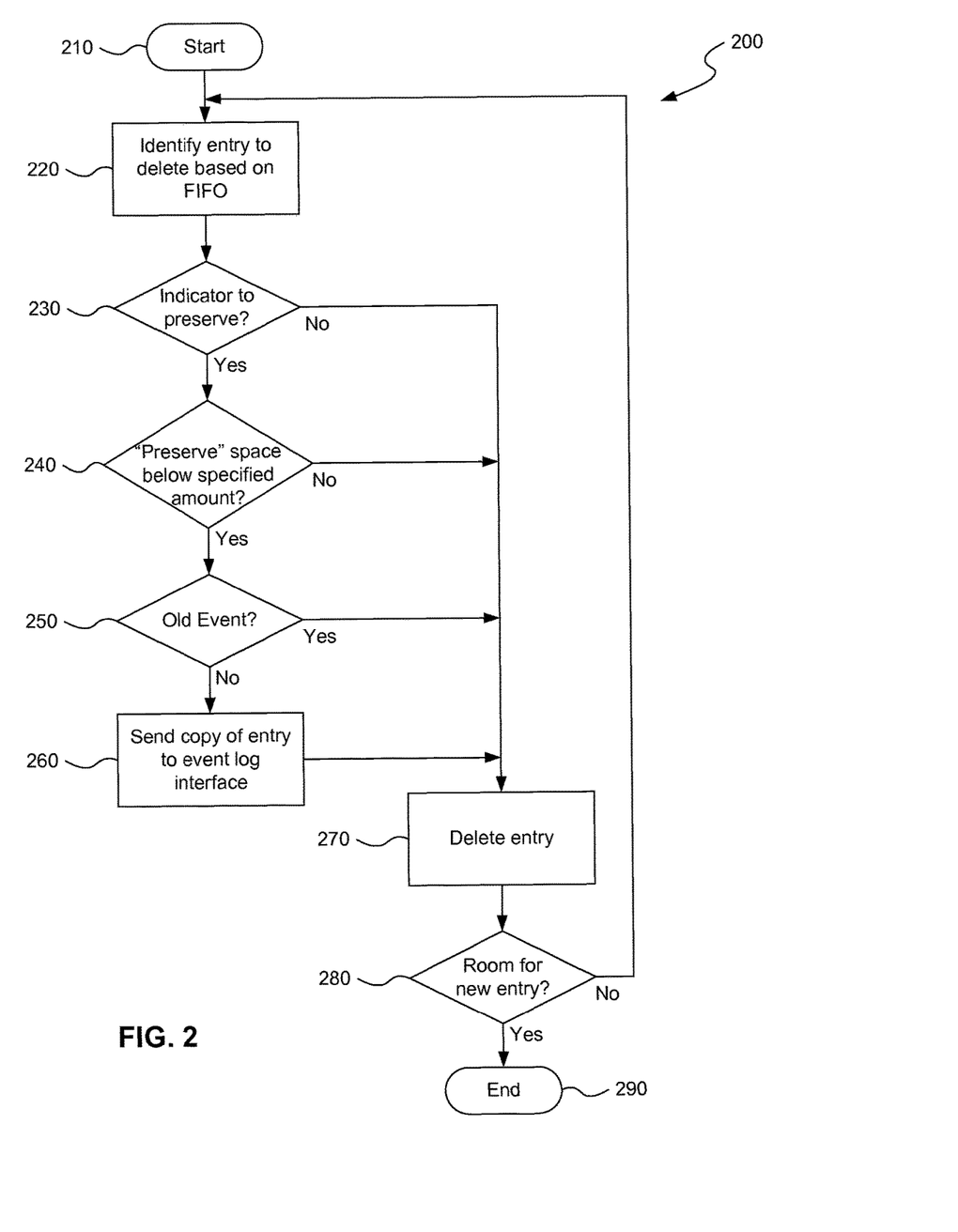
FIG. 2 depicts a flow diagram of an example method for handling deletion of entries in an event log to create room for an entry to be added.

Referring to FIG. 2, a flow diagram of an example method 200 for handling deletion of entries in an event log to create room for an entry to be added is depicted. Method 200 begins at block 210. Method 200 may begin in response to determining that a new entry is to be written in the event log and that there is not enough space for the entry in the event log. At block 220, an entry to be deleted is identified based on a First In, First Out method. Thus, of the entries in the event log, the entry which was entered first is identified.

At block 230, it is determined whether the entry contains an indicator to preserve. If the entry does not contain an indicator to preserve, method 200 proceeds to block 270 and deletes the entry. If the entry contains an indicator to preserve, method 200 proceeds to block 240.

At block 240, it is determined whether the amount of storage space in the event log containing entries with an indicator to preserve is below a specified amount. If the amount of "preserve" storage space in the event log is not below the specified amount, method 200 proceeds to block 270 and deletes the entry. If the amount of "preserve"

storage space in the event log is below the specified amount, method 200 proceeds to block 250.

At block 250, it is determined whether the event associated with the entry is an old event. For example, determining an event is an old event may include determining the period of time since the original entry associated with the event was received at the event log interface, using the timestamp in the entry, and determining the period of time is greater than a specified period of time. If the event is an old event, method 200 proceeds to block 270 and deletes the entry. If the event is not an old event, method 200 proceeds to block 260 and sends a copy of the entry to the event log interface to be entered into the event log before proceeding to block 270 and deleting the entry.

At block 280, after deleting the entry, it is determined whether there is room in the event log for the new entry. If there is not room, method 200 returns to block 220. If there is enough room, method 200 proceeds to block 290 and ends.

Figure 3:
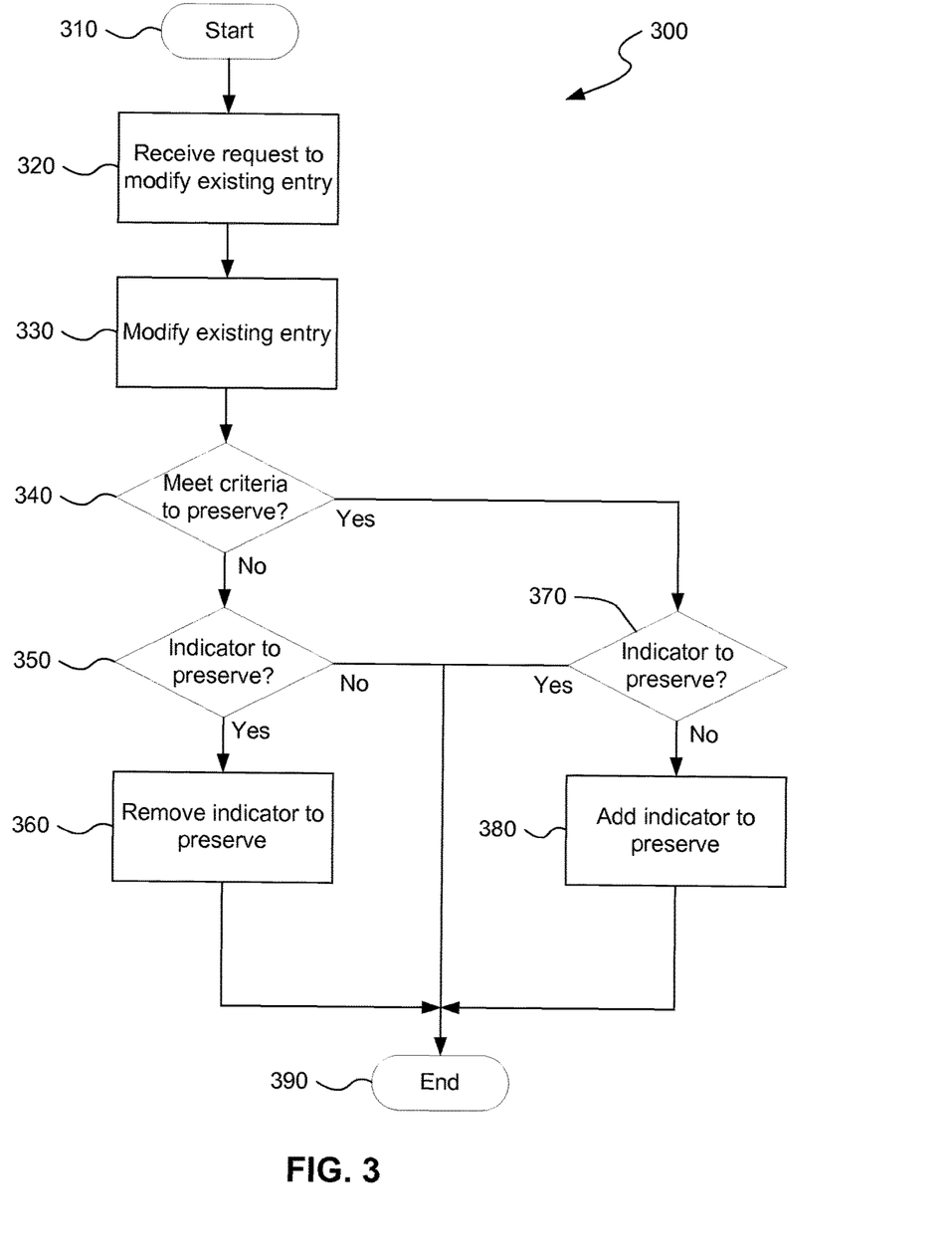
FIG. 3 depicts a flow diagram of an example method for modifying an entry in an event log.

Referring to FIG. 3, a flow diagram of an example method 300 for modifying an entry in an event log is depicted. Method 300 begins at block 310. At block 320, a request to modify an existing entry in an event log is received at an event log interface. At block 330, the existing entry is modified. At block 340, it is determined whether the entry meets the criteria to preserve.

If, at block 340, the entry does not meet the criteria to preserve, method 300 proceeds to block 350. At block 350, it is determined whether the entry contains an indicator to preserve. If the entry does not contain an indicator to preserve, method 300 proceeds to block 390 and ends. If the entry does contain an indicator to preserve, method 300 proceeds to block 360 and removes the indicator to preserve.

If, at block 340, the entry does meet the criteria to preserve, method 300 proceeds to block 370. At block 370, it is determined whether the entry contains an indicator to preserve. If the entry contains an indicator to preserve, method 300 proceeds to block 390 and ends. If the entry does not contain an indicator to preserve, method 300 proceeds to block 380 and adds an indicator to preserve to the entry.

Figure 4:
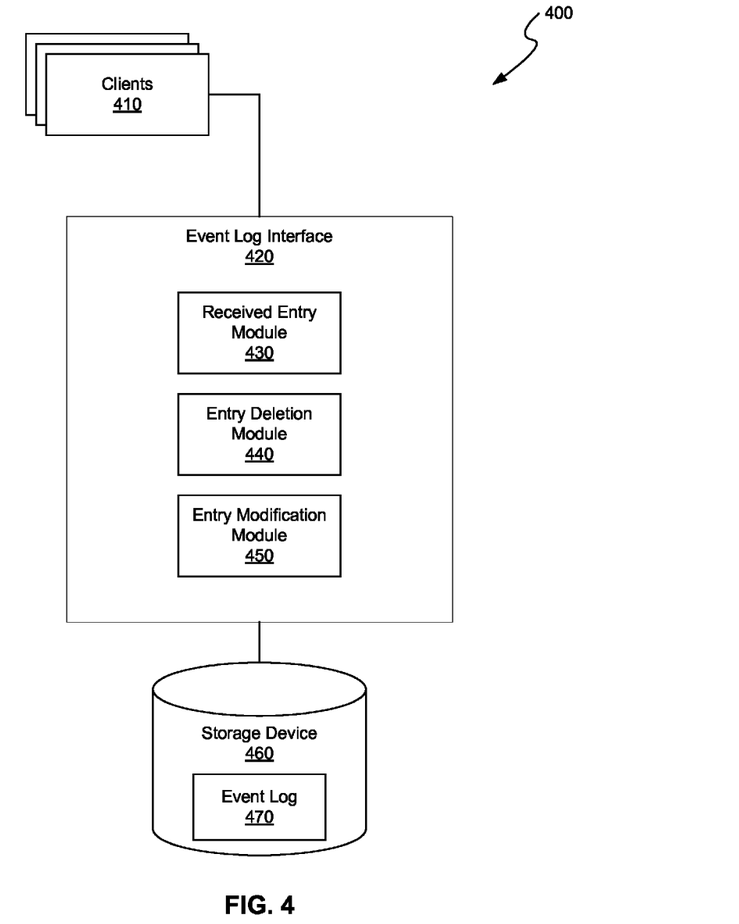
FIG. 4 depicts a block diagram of an example system for maintaining an event log that preserves high value entries.

Referring to FIG. 4, a block diagram of an example system 400 for maintaining an event log that retains high value entries. System 400 includes one or more clients 410 configured to communicate event entries to an event log interface 420. Event log interface 420 is configured to maintain an event log 470 in a storage device 460. Event log interface 420 may include received entry module 430, entry deletion module 440, and entry modification module 450. Received entry module 430 may be configured to handle received event entries. The received entries may be new entries from clients 410 or may be copies of previous entries. Received entry module 430 may be configured to perform method 100 described herein in reference to FIG. 1. Entry deletion module 440 may be configured to handle deletion of entries in event log 470 to make room for another entry. Entry deletion module 440 may be configured to perform method 200 described herein in reference to FIG. 2. Entry modification module 450 may be configured to modify entries in event log 470. Entry modification module 450 may be configured to perform method 300 described herein in reference to FIG. 3.

Figure 5:
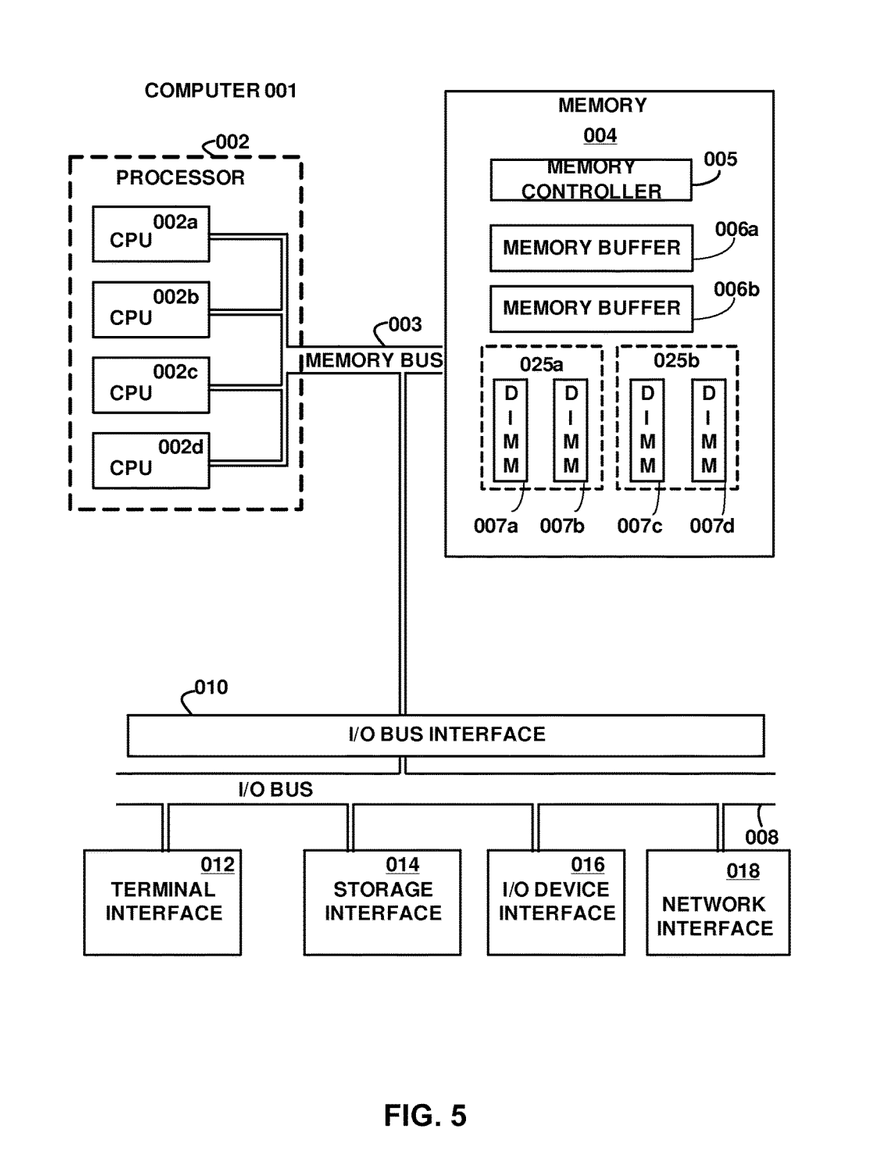
FIG. 5 depicts a high-level block diagram of an example system for implementing one or more embodiments of the invention.

Referring to FIG. 5, a high-level block diagram of an example system for implementing one or more embodiments of the invention is depicted. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 5 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 5 is intended to depict the representative major components of an exemplary computer system 001. But individual components may have greater complexity than represented in FIG. 5, components other than or in addition to those shown in FIG. 5 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing an event log, the method comprising:
   receiving a first entry at an event log interface, the event log interface configured to store received entries in an event log;
   determining there is not enough storage space to store the first entry in the event log;
   identifying a second entry, the second entry an oldest entry in the event log based on when the second entry was written to the event log;
   determining the second entry contains an indicator to preserve;
   sending a copy of the second entry to the event log interface to be written to the event log;
   deleting one or more entries from the event log, the one or more entries including the second entry;
   writing the first entry to the event log; and
   writing the copy of the second entry to the event log.

2. The method of claim 1, wherein the second entry includes a timestamp, the timestamp indicating when an event associated with the second entry was first received at the event log interface, and wherein the copy of the second entry includes the timestamp.

3. The method of claim 2, further comprising:
   determining a first period of time since the event occurred is not greater than a specified period of time, the first period of time based on the timestamp, wherein the sending the copy of the second entry to the event log interface occurs in response to the determining the first period of time since the event occurred is not greater than the specified period of time.

4. The method of claim 1, further comprising:
   determining the event log has less than a specified amount of storage space containing entries with the indicator to be preserved, wherein the sending the copy of the second entry to the event log interface occurs in response to the determining the event log has less than the specified amount of storage space containing entries with the indicator to be preserved.

5. The method of claim 2, further comprising:
   determining a first period of time since the event occurred is not greater than a specified period of time, the first period of time based on the timestamp; and
   determining the event log has less than a specified amount of storage space containing entries with the indicator to be preserved, wherein the sending the copy of the second entry to the event log interface occurs in response to the determining the first period of time since the event occurred is not greater than the specified period of time and the determining the event log has less than the specified amount of storage space containing entries with the indicator to be preserved.

6. The method of claim 1, further comprising:
   determining the first entry meets criteria to be preserved; and
   adding the indicator to preserve to the first entry.

7. The method of claim 6, further comprising:
   modifying the first entry;
   determining the first entry no longer meets criteria to be preserved; and
   removing the indicator to preserve from the first entry.

8. A computer program product for managing an event log, the computer program product comprising a computer readable storage medium having program instructions embodied therewith, wherein the computer readable storage medium is not a transitory signal per se, the program instructions executable by a computer to cause the computer to perform a method comprising:
  receiving a first entry at an event log interface, the event log interface configured to store received entries in an event log;
  determining there is not enough storage space to store the first entry in the event log;
  identifying a second entry, the second entry an oldest entry in the event log based on when the second entry was written to the event log;
  determining the second entry contains an indicator to preserve;
  sending a copy of the second entry to the event log interface to be written to the event log;
  deleting one or more entries from the event log, the one or more entries including the second entry;
  writing the first entry to the event log; and
  writing the copy of the second entry to the event log.

9. The computer program product of claim 8, wherein the second entry includes a timestamp, the timestamp indicating when an event associated with the second entry was first received at the event log interface, and wherein the copy of the second entry includes the timestamp.

10. The computer program product of claim 9, wherein the method further comprises:
  determining a first period of time since the event occurred is not greater than a specified period of time, the first period of time based on the timestamp, wherein the sending the copy of the second entry to the event log interface occurs in response to the determining the first period of time since the event occurred is not greater than the specified period of time.

11. The computer program product of claim 8, wherein the method further comprises:
  determining the event log has less than a specified amount of storage space containing entries with the indicator to be preserved, wherein the sending the copy of the second entry to the event log interface occurs in response to the determining the event log has less than the specified amount of storage space containing entries with the indicator to be preserved.

12. The computer program product of claim 9, wherein the method further comprises:
  determining a first period of time since the event occurred is not greater than a specified period of time, the first period of time based on the timestamp; and
  determining the event log has less than a specified amount of storage space containing entries with the indicator to be preserved, wherein the sending the copy of the second entry to the event log interface occurs in response to the determining the first period of time since the event occurred is not greater than the specified period of time and the determining the event log has less than the specified amount of storage space containing entries with the indicator to be preserved.

13. The computer program product of claim 8, wherein the method further comprises:
  determining the first entry meets criteria to be preserved; and
  adding the indicator to preserve to the first entry.

14. The computer program product of claim 13, wherein the method further comprises:
  modifying the first entry;
  determining the first entry no longer meets criteria to be preserved; and
  removing the indicator to preserve from the first entry.

15. A system for managing an event log, the system comprising:
  one or more processors, one or more computer-readable memories, one or more computer-readable tangible storage devices, and program instructions stored on at least one of the one or more storage devices for execution by at least one of the one or more processors via at least one of the one or more memories, the program instructions configured to cause the system to perform a method comprising:
  receiving a first entry at an event log interface, the event log interface configured to store received entries in an event log;
  determining there is not enough storage space to store the first entry in the event log;
  identifying a second entry, the second entry an oldest entry in the event log based on when the second entry was written to the event log;
  determining the second entry contains an indicator to preserve;
  sending a copy of the second entry to the event log interface to be written to the event log;
  deleting one or more entries from the event log, the one or more entries including the second entry;
  writing the first entry to the event log; and
  writing the copy of the second entry to the event log.

16. The system of claim 15, wherein the second entry includes a timestamp, the timestamp indicating when an event associated with the second entry was first received at the event log interface, and wherein the copy of the second entry includes the timestamp.

17. The system of claim 16, wherein the method further comprises:
  determining a first period of time since the event occurred is not greater than a specified period of time, the first period of time based on the timestamp, wherein the sending the copy of the second entry to the event log interface occurs in response to the determining the first period of time since the event occurred is not greater than the specified period of time.

18. The system of claim 15, wherein the method further comprises:
  determining the event log has less than a specified amount of storage space containing entries with the indicator to be preserved, wherein the sending the copy of the second entry to the event log interface occurs in response to the determining the event log has less than the specified amount of storage space containing entries with the indicator to be preserved.

19. The system of claim 16, wherein the method further comprises:
  determining a first period of time since the event occurred is not greater than a specified period of time, the first period of time based on the timestamp; and
  determining the event log has less than a specified amount of storage space containing entries with the indicator to be preserved, wherein the sending the copy of the second entry to the event log interface occurs in response to the determining the first period of time since the event occurred is not greater than the specified period of time and the determining the event log has less than the specified amount of storage space containing entries with the indicator to be preserved.

20. The system of claim 15, wherein the method further comprises:
   determining the first entry meets criteria to be preserved; and
   adding the indicator to preserve to the first entry.

* * * * *